United States Patent Office 3,236,841
Patented Feb. 22, 1966

3,236,841
7-ACYLAMINOCEPHALOSPORANIC ACIDS
Frederick A. Kuehl, Jr., Rumson, Robert E. Harman, Avenel, and Robert E. Ormond, Edison, N.J., assignors to Merck & Co., Inc., Rahway, N.J., a corporation of New Jersey
No Drawing. Filed Nov. 22, 1961, Ser. No. 154,349
2 Claims. (Cl. 260—243)

This invention relates to derivatives of 7-aminocephalosporanic acid and related compounds and to methods for the preparation of such derivatives.

The antibiotic substance of cephalosporin C and its preparation by fermentation of suitable species of cephalosporium has been described in the art. The antibiotic is active against gram positive and gram negative bacteria. Upon acid treatment of the antibiotic cephalosporin C, the molecule may be split into two parts, a side-chain which is a α-aminoadipic acid and a nucleus given the name 7-aminocephalosporanic acid which has the following structure:

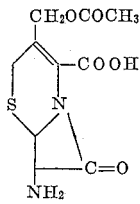

What has been discovered herein is that N-acyl derivatives of 7-aminocephalosporanic acid have broad spectrum antibiotic activity against bacteria.

Accordingly, it is an object of the present invention to provide novel derivatives of cephalosporin C having enhanced antibiotic activity.

Another object of this invention is to provide acyl derivatives of 7-aminocephalosporanic acid and process for the preparation of these derivatives.

These and other objects will be made apparent in the following more detailed description of this invention as illustrated in the several embodiments thereof.

In accordance with the present invention, there is provided derivatives of 7-aminocephalosporanic acid which are active biologically and which may be represented by the general formula:

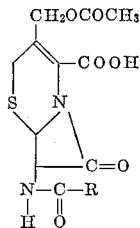

where RCO— is an acyl group.

The compounds of the present invention have considerable activity from a biological standpoint; for example, the 3,4-dimethoxyphenylacetyl derivative of 7-aminocephalosporanic acid is found to be active against *Staphylococcus aureus* when tested under the usual conditions.

In accordance with another feature of the present invention, there is provided a method for the preparation of the compounds described above. The method includes the steps of first subjecting cephalosporin C to acid cleavage to form the starting material 7-aminocephalosporanic acid and then treating the amino compound with a suitable acyl chloride or a corresponding acid anhydride to form the desired acylated product. For example, when p,t-butylphenoxyacetylchloride is utilized in the reaction sequence described above, there is provided the antibiotic 7-(p,t-butylphenoxyacetylamide)-cephalosporanic acid.

In a similar manner heptylic anhydride provides 7-heptoylamidocephalosporanic acid; α-fluorophenylacetylchloride provides 7-(α-fluorophenylacetamido)-cephalosporanic acid; and lauroyl chloride gives 7-(n-decylacetylamido)-cephalosporanic acid. Other acylating groups will readily suggest themselves to the art. Preferably the acyl group RCO— is such that R has between 1 and 20 carbon atoms.

The more detailed features of the invention will be illustrated with reference to the accompanying examples which follow:

EXAMPLE I

*Preparation of 7-(α-fluorophenylacetamido)-cephalosporanic acid*

The starting material 7-aminocephalosporanic acid is prepared in the following manner. The sodium salt of cephalosporin C (2 grams) is dissolved in 30 ml. of water, the pH is adjusted to 2.5 by addition of Dowex 50–X8 ($H^+$), the resin filtered and washed with 10 ml. water, and 10.2 ml. N-HCl added to the combined filtrate and washings. The solution is kept at 20° for 3 days and added to a column of Dowex-1 (acetate form), 2.1 cm. diam. x 7 cm. The percolate is collected in 5 ml. fractions (1 to 12) and the column is eluted with water until a total of 34 fractions has been collected. Elution is then begun with 0.5 N acetic acid and an additional 66 fractions is collected. Fractions 36–45 contain most of the desired product, 7-aminocephalosporanic acid.

4.1 mg. of 7-aminocephalosporanic acid is suspended in 4.5 ml. of water and 0.1 N sodium hydroxide is added with stirring until solution is effected at a pH of 7. Thereafter a solution of 15 mg. of L-α-fluorophenylacetylchloride in 2 ml. of acetone and alternately 0.1 N sodium hydroxide is added in small portions at ice-cooling and at a pH of 5.0–7.5. The temperature is then allowed to rise to 25° C. and the reaction mixture is held at that temperature for about ½ hour. The acetone solvent is then removed by vacuum distillation at which time the volume of the solution is 3.5 ml. and the pH is 6.0. Then phosphoric acid is added to adjust the pH to 3.1 and the solution is extracted with benzene (3.1 ml.); the pH is readjusted to 3.3 and extraction repeated with benzene (2 x 3 ml.). The pH is then lowered to 2.4 with phosphoric acid and the solution is extracted with ethyl acetate (3 x 2 ml.). The ethyl acetate extract is reduced to 0.4 ml. in vacuum, 1.0 ml. of water is added and the pH is readjusted with 0.1 sodium hydroxide to 6.5. The solvent is then removed in vacuum. The solid residue (26.9 mg.) is taken up in 0.1 ml. of water and acetone is added to a total of 1.0 ml. At this point in the isolation procedure the sodium salt of α-fluorophenylacetic acid precipitates and is discarded. The mother liquors are taken to dryness in vacuum and the solid residue is extracted with 1 ml. of water to provide 8.6 mg. of the very water-soluble crude sodium salt of 7-(α-fluorophenylacetamido)-cephalosporanic acid. The crude product is paper chromatographed in the system n-butyl-ethanol-water (4:1:5). The paper strips are sectioned and appropriate areas are eluted with water to yield the sodium salt of 7-(α-fluorophenylacetamido)-cephalosporanic acid.

EXAMPLE II

*Preparation of 7-(p-t-butylphenoxyacetyl)-cephalosporanic acid*

Following the procedure described in detail in Example 1 and using p-t-butylphenoxyacetylchloride in 50% aqueous acetone as the acylating agent, there is produced 6.8 mg. of solids in the benzene extract at a pH of 3.5. The material is then paper chromatographed in the system n-butyl alcohol-ethanol-water (4:1:5) to separate the mixture of the desired product and the excess acylating acid. The paper strips are sectioned and appropriate areas are eluted with water to yield 2.2 mg. (41% yield) of the sodium salt of 7(p-t-butylphenoxyacetyl)-cephalosporanic acid.

EXAMPLE III

*Preparation of 7-(n-decylacetamido)-cephalosporanic acid*

Following the procedure described in detail above, 3.97 mg. of 7-aminocephalosporanic acid is acylated with lauroyl chloride. The excess acid is extracted at pH 5.0 with isooctane and the product with ethyl acetate. There is thus obtained 1.72 mg. of *the pure* product 7-(n-decylacetamido)-cephalosporanic acid.

EXAMPLE IV

*Preparation of 7-(3,4-dimethoxyphenylacetamido)-cephalosporanic acid*

Following the procedure described in detail above, 2.9 mg. of 7-aminocephalosporanic acid is acylated with 3,4-dimethoxyacetylchloride to produce 3.75 mg. of pure 7-(3,4-dimethoxyphenylacetamido)-cephalosporanic acid.

EXAMPE V

*Preparation of 7-(phenylacetamido)-cephalosporanic acid*

Following the procedure described in detail above, 2.6 mg. of 7-aminocephalosporanic acid is acylated with phenylacetylchloride to give 2.5 mg. of pure 7-(phenylacetamido)-cephalosporanic acid.

EXAMPLE VI

*Preparation of 7-(heptylacetamido)-cephalosporanic acid*

Following the procedure described in detail above, 7-aminocephalosporanic acid is acylated with heptylic anhydride in dry acetone to provide 7-(heptoylamido)-cephalosporanic acid.

EXAMPLE VII

Following the procedure described in detail above, 7-aminocephalosporanic acid is acylated with 2,5-dimethylphenoxyacetyl chloride to produce 7-(2,5-dimethylphenoxyacetamido)-cephalosporanic acid; 4-chloro-2-methylphenoxyacetyl chloride to produce 7-(4-chloro-2-methylphenoxyacetamido)-cephalosporanic acid; 4-diphenyloxyacetyl chloride to produce 7-(4-diphenyloxyacetamido)-cephalosporanic acid; 2,4-di-t-amylphenoxyacetyl chloride to produce 7-(2,4,-di-t-amylphenoxyacetamido)-cephalosporanic acid; 2,6-dimethoxybenzoyl chloride to produce 7-(2,6-dimethoxybenzamido)-cephalosporanic acid; p-acetylphenoxyacetyl chloride to produce 7-(acetylphenoxyacetamido)-cephalosporanic acid; (D) α-fluorophenylacetyl chloride to produce 7-(Dα-fluorophenylacetamido)-cephalosporanic acid; dihydrocinnamoyl chloride to produce 7-dihydrocinnamamidocephalosporanic acid; cinnamoyl chloride to produce 7-cinnamamidocephalosporanic acid; 2,4-dimethoxybenzoyl chloride to produce 7-(2,4-dimethoxybenzamido)-cephalosporanic acid; 2,3-dimethoxycinnamoyl chloride to produce 7-(2,3-dimethoxycinnamamido)-cephalosporanic acid; (L) α-chlorophenylacetyl chloride to produce 7-Lα-chlorophenylacetamido)-cephalosporanic acid; lauroyl chloride to produce 7-lauramidocephalosporanic acid; decanoyl chloride to produce 7-decanamidocephalosporanic acid; octanoyl chloride to produce 7-octanamidocephalosporanic acid; β-carbethoxypropionyl chloride to produce 7-(β-carbethoxypropionamido)-cephalosporanic acid; 3-ethylhexanoyl to produce 7-(3-ethylhexanamido)-cephalosporanic acid; t-butylacetyl chloride to produce 7-(t-butylacetamido)-cephalosporanic acid; carbobenzoxy chloride to produce N-carbobenzoxy-7-aminocephalosporanic acid; β-chloropropionyl chloride to produce 7-(β-chloropropionamido)-cephalosporanic acid; propionyl chloride to produce 7-propionamidocephalosporanic acid; acetyl chloride to produce 7-acetamidocephalosporanic acid; i-butylchloroformate to produce 7 - (i - butoxycarbonamido) - cephalosporanic acid; 3,5-dinitrobenzoyl chloride to produce 7-(3,5-dinitrobenzamido)-cephalosporanic acid; 2-methyl-4-methylthiobenzoyl chloride to produce 7-(2-methyl-4-methylthiobenzamido)-cephalosporanic acid; anisoyl chloride to produce 7-anisamidocephalosporanic acid; p-chlorobenzoyl chloride to produce 7-(p-chlorobenzamido)-cephalosporanic acid; benzoyl chloride to produce 7-benzamidocephalosporanic acid; 2,4-di-chlorobenzoyl chloride to produce 7-(2,4-dichlorobenzamido)-cephalosporanic acid; p-nitrobenzoyl chloride to produce 7-(p-nitrobenzamido)-cephalosporanic acid; p-ethoxybenzoyl chloride to produce 7-(p-ethoxybenzamido)-cephalosporanic acid; cyclohexanecarbonyl chloride to produce 7-cyclohexylcarbonamido-cephalosporanic acid; 2-furoyl chloride to produce 7-(2-furancarbonamido)-cephalosporanic acid and palmitoyl chloride to produce 7-palmitamidocephalosporanic acid.

The N-acyl derivatives of 7-aminocephalosporanic acid of the present invention have broad spectrum antibiotic activity against bacteria. Particularly effective are those products described in Examples I–IV.

What has been described herein are acylated derivatives of 7-aminocephalosporanic acid having an acyl group, —COR, attached to the amino position of 7-aminocephalosporanic acid. Included in the R grouping are such radicals as alkyl, aryl, aralkyl, cycloalkyl, heterocyclic, alkoxy, aryloxy and substituted derivatives thereof, including the above and halogen, nitro, methylthio and the like. Preferably the R group has between 1 and 20 carbon atoms.

While the invention has been described with reference to particular embodiments thereof, it will be understood that changes and modifications may be made which are within the skill of the art.

What is claimed is:
1. 7-(α-fluorophenylacetamido)-cephalosporanic acid.
2. 7-(p,t-butylphenoxyacetyl)-cephalosporanic acid.

References Cited by the Examiner

UNITED STATES PATENTS

| | | | |
|---|---|---|---|
| 2,941,995 | 6/1960 | Doyle et al. | 260—239.1 |
| 2,951,839 | 9/1960 | Doyle et al. | 260—239.1 |
| 3,117,126 | 1/1964 | Hoover et al. | 261—243 |
| 3,173,916 | 3/1965 | Schull et al. | 260—243 |
| 3,196,151 | 7/1965 | Hoover et al. | 260—243 |
| 3,202,656 | 8/1965 | Abraham et al. | 260—243 |

OTHER REFERENCES

Abraham et al.: Endeavour, vol. XX, No. 78, pp. 92–100 (April 1961).

Hale et al.: Biochem, Jour., vol. 79, No. 2, pages 403–408 (1961).

Hackh's Chemical Dictionary, page 21 (second edition), 1937.

Jour. Amer. Medical Assoc., page 466, May 24, 1958.

Morton: The Chemistry of Heterocyclic Compounds, page VI of the preface (1946).

Wertheim: Textbook of Organic Chemistry, pages 763–764 (1945).

NICHOLAS S. RIZZO, *Primary Examiner.*

JAMES W. ADAMS, *Assistant Examiner.*